United States Patent [19]

Lucas

[11] Patent Number: 4,965,661
[45] Date of Patent: Oct. 23, 1990

[54] METHOD AND APPARATUS FOR INCREASING THE DEFINITON OF AN NTSC VIDEO SIGNAL USING AN AUGMENTATION CHANNEL

[75] Inventor: Keith Lucas, Richmond Hill, Canada
[73] Assignee: Scientific-Atlanta, Inc., Atlanta, Ga.
[21] Appl. No.: 228,274
[22] Filed: Aug. 4, 1988
[51] Int. Cl.$^5$ ................... H04N 11/00; H04N 7/12
[52] U.S. Cl. ................................. 358/12; 358/141
[58] Field of Search ........................... 358/12, 141
[56] References Cited

U.S. PATENT DOCUMENTS

| | | | |
|---|---|---|---|
| 4,286,291 | 8/1981 | Taylor et al. | 358/138 |
| 4,292,652 | 9/1981 | Yumde et al. | 358/138 |
| 4,323,916 | 4/1982 | Dischert et al. | 358/13 |
| 4,364,090 | 12/1982 | Wendland | 358/140 |
| 4,449,143 | 5/1984 | Dischert et al. | 358/11 |
| 4,520,385 | 5/1985 | Jackson et al. | 358/12 |
| 4,521,803 | 6/1985 | Gittinger | 358/12 |
| 4,531,151 | 7/1985 | Hentschke | 358/135 |
| 4,535,352 | 8/1985 | Haskell | 358/16 |
| 4,551,753 | 11/1985 | Hishizawa et al. | 358/140 |
| 4,558,347 | 12/1985 | Pritchard et al. | 358/4 |
| 4,558,362 | 12/1985 | Sugiyama | 358/138 |
| 4,564,857 | 1/1986 | LoCicero et al. | 358/11 |
| 4,574,300 | 3/1986 | Hulyer | 358/11 |
| 4,581,640 | 4/1986 | Cole | 358/141 |
| 4,603,350 | 7/1986 | Arbeiter et al. | 358/140 |
| 4,605,950 | 8/1986 | Goldberg et al. | 358/11 |
| 4,608,600 | 8/1986 | Sugiyama | 358/138 |
| 4,622,577 | 11/1986 | Reitmeier et al. | 358/11 |
| 4,630,099 | 12/1986 | Rzeszewski | 358/12 |
| 4,631,574 | 12/1986 | LoCicero et al. | 358/12 |
| 4,651,208 | 3/1987 | Rhodes et al. | 358/140 |
| 4,652,904 | 3/1987 | van de Polder | 358/12 |
| 4,661,850 | 4/1987 | Strolle et al. | 358/140 |
| 4,665,427 | 5/1987 | Beckley et al. | 358/11 |
| 4,665,436 | 5/1987 | Osborne et al. | 358/136 |
| 4,672,424 | 6/1987 | Lechner | 358/14 |
| 4,694,338 | 9/1987 | Tsinberg | 358/141 |
| 4,698,675 | 10/1987 | Casey | 358/140 |
| 4,713,688 | 12/1987 | Guttner | 358/141 |

FOREIGN PATENT DOCUMENTS 0026395 9/1980 European Pat. Off. .
3341393 6/1985 Fed. Rep. of Germany .
83/02704 8/1983 PCT Int'l Appl. .

OTHER PUBLICATIONS

"Advanced Television Systems", Robert Hopkins, IEEE Transactions on Consumer Electronics, Feb. 1988.
"Hierarchical High Definition Television System Compatible with the NTSC Environment", Philips Laboratories Sep. 1987.
"B-MAC and HDTV-Does It Fit?", Dr. Keith Lucas, Digital Video Systems, Corp., Oct. 1987.
"Multiplexed Analog Component Television Broadcast System Parameter Specifications", Advanced Television Systems Committee, Apr. 1987.
"Direct Television Broadcast by Satellite Desirability of a New Transmission Standard", IBA Report 116/81, Sep. 1981.
"The Sampling of Television Images", IBA Report 112/81, May 1981.
"Subsampling Techniques for High-Definition MAC", Philips Research Laboratories.
"Compatible Wideband Single-Channel HDTV Transmission", CCIR Document JLWP 10-11/3-7, Sep. 1986.
IBM Technical Disclosure Bulletin, vol. 11, p. 1187, Feb. 1969.

*Primary Examiner*—John W. Shepperd
*Attorney, Agent, or Firm*—Banner, Birch, McKie & Beckett

[57] ABSTRACT

A method for increasing the definition of an NTSC video signal using an augmentation channel involves the generation of both a line summation signal as well as a line difference signal. From the line summation signal, a horizontal detail signal may be derived which may be diagonally filtered and added to a diagonally filtered vertical detail signal and transmitted in a bandwidth of approximately 2.5 mega-hertz. Furthermore, the line summation signal may be applied for the derivation of a standard NTSC video signal which is transmitted separately from the augmentation channel. Decoder apparatus comprises a single digital diagonal filter having complimentary output functions resulting in both improved horizontal and vertical resolution at low cost.

22 Claims, 5 Drawing Sheets

METHOD AND APPARATUS FOR INCREASING THE DEFINITON OF AN NTSC VIDEO SIGNAL USING AN AUGMENTATION CHANNEL

BACKGROUND OF THE INVENTION

1. Technical Field

This invention relates to the field of transmitting high definition television signals and, more particularly, to a method and apparatus for increasing the definition of an N.T.S.C. signal using a separately generated and transmitted augmentation channel.

2. Description of the Related Art

There is a growing interest in the transmission of television signals which allow an increase in picture definition in both the vertical and horizontal dimensions. There are, however, many millions of television sets already in use which receive and display the standard North American and Japanese television transmission standard (known as the National Television Subcommittee or N.T.S.C. standard).

Since there are so many existent television sets which display only an N.T.S.C. television signal, there have evolved two basic approaches to providing high definition television service. One approach is to transmit a high definition television signal in a new format and, consequently, impose a requirement on all users that they either obtain a decoder for their existing television sets capable of recovering an NTSC signal from the new format or buy a new television receiver for receiving the new format. To receive the new format and to display a high resolution image would require the user's obtaining a new expensive high definition television receiver. To make the alternative decoder viable, an obvious objective of such an approach is to make the cost of the NTSC decoder for an existing television as inexpensive as possible. This approach, however, is highly unsatisfactory to broadcasters who may lose considerable revenue from users and at the same time must expend considerable sums to adapt to the new format.

One solution which follows this approach relates to the transmission of a high definition multiplexed analog components (MAC) signal from which an NTSC signal may be inexpensively derived. The solution is described in copending U.S. application Ser. No. 092,305 filed Sept. 2, 1987, incorporated herein by reference. In the disclosed technique a line summation signal is generated from which improved horizontal resolution information may be derived and a line difference signal is generated from which improved vertical resolution information may be obtained. A two dimensional diagonal filter is applied to a high resolution signal and alternate samples dropped leaving a quincunx or figure of five pattern. A full high resolution signal is restored by reintroducing samples previously dropped by interpolation from transmitted line summation and line difference signals.

Any new format for the transmission of higher definition signals should take into account the existing investment by the public and by manufacturers in existent NTSC television sets. For example, if a television channel distributed by a broadcaster in NTSC format were to change to a new television signal format, transmission of the NTSC format signal could not be practically terminated unless the new format could be received by existing standard NTSC compatible sets. Otherwise, the broadcaster would immediately be deprived of all of its viewers, and their viewers deprived of service until each viewer upgrades their home equipment to receive the new standard format.

For this reason, there is considerable interest in an alternative approach to the development of a high definition television (HDTV) format which may be received and displayed (without increased resolution) by existing television receivers. New receivers, containing more advanced circuitry, should receive and display high definition pictures when tuned to the same transmitted channel. A television signal format with the property of being compatible with existing NTSC and new high definition television sets is known as an "NTSC compatible HDTV signal".

One way to create an NTSC compatible HDTV signal is to introduce an "augmentation channel" to the present NTSC signal. A wide picture format television transmission system involving an augmentation channel is proposed in U.S. Pat. No. 4,581,640 to Cole, incorporated herein by reference. A second separate channel to the NTSC signal channel augments the existing NTSC signal by carrying sidepanels to increase the width of the picture and additional information to increase the vertical definition and the horizontal definition. As developed and proposed for implementation by North American Phillps Corporation and in accordance with a convention of reference to the output scanning rate, the augmentation channel is formed by time-expanding high frequency signals by 2:3 and modulating a line difference signal to a subcarrier at 12.2 megahertz, a multiple of the NTSC line frequency and above the time expanded high frequency $Y_H$ luminance component of the high definition NTSC signal. The line difference component then is multiplexed at approximately 9.4 to 13 megahertz while the high definition information is at 7.3 to 10.4 megahertz.

This multiplexing takes advantage of the little overlap (9.4–10.4 megahertz) between the two components. An improvement to the initial Philips proposal is described in Tsinberg, U.S. Pat. No. 4,694,338, also incorporated herein by reference, who proposes a solution to problems created by overlapping portions of the transmitted augmentation channel. Any claim to improved horizontal definition appears to be related to the line difference signal containing horizontal information. However, while the Philips augmentation channel proposal is viable, there is still a requirement in the art for an economical and efficient alternative design for implementation of the augmentation channel and which further improves horizontal resolution.

SUMMARY OF THE INVENTION

The NTSC standard used for colour television transmission in North America and Japan has certain picture impairments when viewed at distances less than three times picture height. They are as follows:

(i) Cross-Colour which relates to the interpretation of luminance energy as colour information by NTSC standard receivers;

(ii) Cross-Luminance which relates to the interpretation of chrominance energy as luminance information by NTSC standard receivers;

(iii) Line Structure which relates to the undesirable visibility of line-structure resulting from the use of interlaced scanning which insufficient lines;

(iv) Limited vertical resolution, and (v) Limited horizontal resolution.

Also, it is generally agreed that the 4:3 aspect ratio employed in the format is inappropriate for larger screens, and that a wider picture having a 16:9 aspect ratio is desirable.

In recent years, sophisticated two dimensional filter technology has been demonstrated which can eliminate the effects of cross-colour and cross-luminance when applied both in the NTSC transmitter and the NTSC receiver. The purpose of the present invention is therefore to efficiently address the problems of increasing horizontal as well as vertical resolution and alleviating line structure visibility, while increasing the aspect ratio of the picture to 16:9.

It is known to alleviate the effects of visibility of line-structure by generating additional TV lines located between the lines of a typical NTSC display. These lines can be constructed using interpolation techniques. While vertical interpolation of additional lines within one field decreases visibility of line-structure, it also inevitably decreases vertical resolution.

The solution for broadcasters proposed in the Philips system described above and in other systems is the use of a vertical detail signal (line-difference signal) to improve the interpolation accuracy. This technique both eliminates visible line structure and increases vertical definition. The line-difference signal is generated at the transmitter and incorporated into the augmentation channel for use by all receivers.

On the other hand, the line difference signal thus generated may require time compression to make room for the sidepanels and lead to a loss of some of the vertical resolution gained. While the vertical resolution loss is correctable by other means, such solutions increase the cost of a decoder. Also, horizontal definition improvement is related to transmission of the line difference signal.

Altogether then in an augmentation channel technique, the augmentation channel should carry the following information:

(a) Sidepanel information to increase the aspect ratio from 4:3 to 16:9;

(b) A line-difference signal to increase the vertical resolution of the 16:9 picture, and to eliminate line-structure visibility, and (c) Information to increase the horizontal definition.

The present invention improves upon the Philips system as a method of generating an augmentation channel including horizontal definition improvement. Both the Philips proposal and the present invention involve the transmission of a line difference signal portion for improved vertical and horizontal resolution and the transmission of sidepanels and chrominance information as portions of an augmentation channel. However, the present invention differs from the Philips proposal in its generation of a horizontal resolution portion from a line summation signal and its combination with a vertical resolution portion from a line difference signal by means of diagonal filtering (whereby perceptible horizontal or vertical resolution is not significantly lost). The vertical and horizontal resolution portions may be transmitted in complimentary form within approximately 2.5 megahertz of bandwidth leaving the remaining useable bandwidth of a six megahertz NTSC-like bandwidth for transmission of sidepanels, chrominance and other data. Furthermore, the generated line summation signal may be employed at a transmitter for the derivation of a standard NTSC signal for transmission with the augmentation channel.

The present application describes a method and apparatus for incorporating all the required information into an augmentation channel which minimizes encoder and decoder costs and improves efficiency.

DETAILED DESCRIPTION

Figure 1:
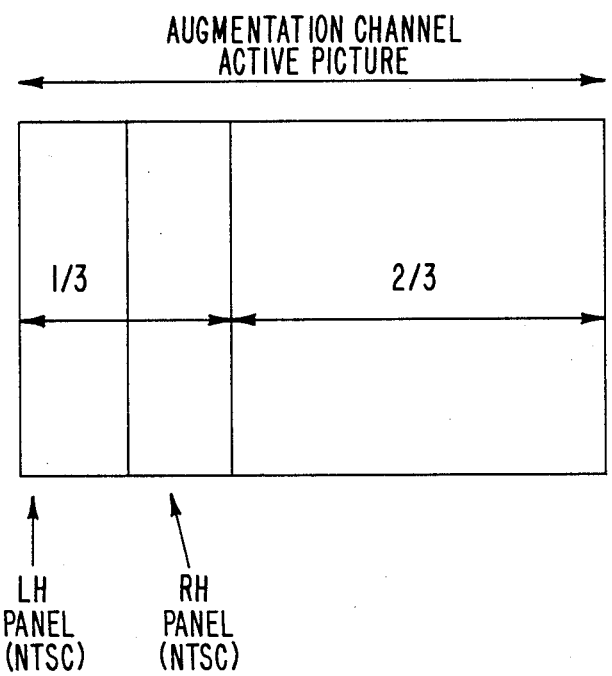
FIG. 1 is a depiction of an augmentation channel with sidepanel signals for increasing active picture width.

Referring to FIG. 1, there is shown a pictorial representation of the requirements for an augmentation channel. The augmentation channel contains a standard sync period and sidepanel signals which increase the width of the picture from a 4:3 to a 16:9 aspect ratio. There is a left hand (LH) and a right hand (RH) sidepanel. The increase in picture width corresponds to a ⅓ increase of the original picture width:

$$16/9 \div 4/3 = 4/3 = 1\tfrac{1}{3}$$

Thus the sidepanel information occupies ¼ of the active line. The remaining ¾ of the line must carry information which increases the definition of a picture 4/3 as wide as the original. To achieve this, a time compression of 2:1 for all definition improvement information is required. A 2:1 time compression has the effect of doubling the bandwidth of the signal.

If it is assumed that the augmentation signal must be carried within a normal radio frequency channel bandwidth of approximately six megahertz, the compressed baseband signal can have a bandwidth of not more than five megahertz. This implies an uncompressed bandwidth of 2.5 megahertz. The objective therefore of the present invention is to carry the maximum possible increase in both vertical and horizontal resolution within a bandwidth of 2.5 megahertz.

Figure 2:
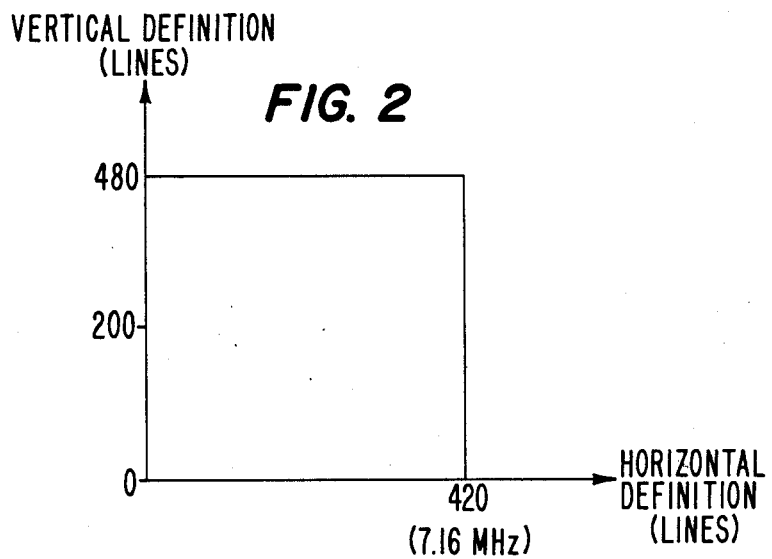
FIG. 2 is a graphical depiction of vertical versus horizontal definition for a 16:9 aspect ratio picture signal.

The present method is presumed to be applied to a high-definition 16:9 aspect-ratio picture scanned sequentially using 525 lines, the horizontal bandwidth of the signal being 14.32 megahertz. Since the present description assumes a line doubling, the interlaced signal from which the sequentially scanned signal has been derived has a bandwidth of 7.16 megahertz. A sequential scan signal of this type supports a vertical definition of 480 lines and a horizontal definition of 420 lines on a 16:9 aspect ratio screen. A two-dimensional spectrum showing horizontal versus vertical definition is shown in FIG. 2.

Figure 3:
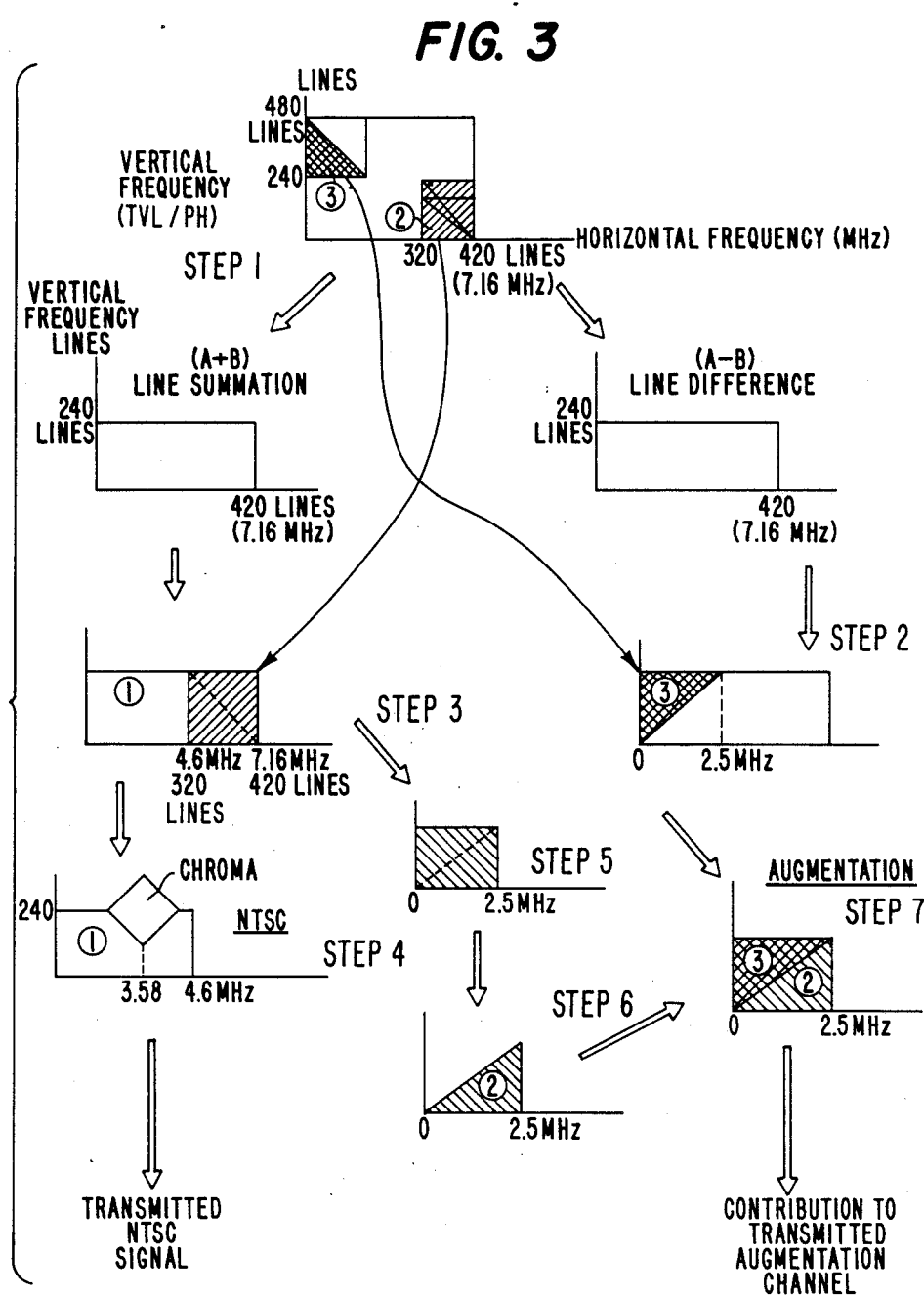
FIG. 3 is a pictorial representation of the method of the present invention for implementing an inexpensive and efficient augmentation channel.

The lines of the television picture are paired, with odd numbered lines labeled A and even numbered lines labeled B. Referring to FIG. 3, each adjacent A, B pair is processed to produce signals (A+B) and (A−B) (Step 1). (This is equivalent to the application of vertical digital filters with coefficients 1,1 and 1,−1 followed by decimation of alternate lines). The signal A+B is a line summation signal and the signal A−B is a line difference signal.

These two signals (A+B and A−B) together contain all of the information necessary to reconstruct the original sequential-scan picture, but each is itself a 525 line interlaced signal. Consequently, further signal processing is then carried out as shown in FIG. 3.

Referring to the right side of FIG. 3, the low frequency portion of the (A−B) signal is a vertical detail signal capable of eliminating visible line-structure. It is fully aliassed vertically (due to the line-pairing process) so that the maximum vertical frequency is carried at zero frequency (the origin). This signal is diagonally filtered using digital filtering techniques to isolate region 3 of FIG. 3 (Step 2). The digital filter employed uses a sampling frequency of 14.32 megahertz (4 fsc), where the color subcarrier is 3.58 megahertz. Diagonal filtering is preferred as it is well known that energy loss at diagonal frequencies is less perceptible to a user than, for example, frequencies lost due to vertical or horizontal filtering.

Referring to the left hand side of FIG. 3, the line summation (A+B) signal also is a properly conditioned signal (having been vertically filtered prior to line decimation). It therefore carries vertical information corresponding to a conventional 525-line 2:1 interlaced signal and can be converted to an NTSC standard format. It also carries horizontal definition information extending to 7.16 megahertz (420 lines). This signal is separated into two components (step 3) using complimentary high-pass/low-pass digital filters also using a sampling frequency of 14.32 megahertz.

The low-pass region (1) resulting from the complimentary filtering is the NTSC luminance signal within an approximately 4.6 megahertz bandwidth and is passed to an NTSC signal transmitter. The NTSC transmitter should comprise 2-dimensional filters to precomb the luminance and chroma signals prior to introduction of an NTSC standard colour subcarrier (step 4) at 3.58 megahertz (227.5 $f_h$).

The high-pass region between 4.6 megahertz and 7.16 megahertz is demodulated to baseband by negating alternate samples (step 5) creating a baseband between 0 and 2.5 megahertz. This translates the energy close to 7.16 megahertz to the origin and the 4.16 megahertz energy to 2.5 megahertz where diagonal digital filters can be efficiently employed to create Region (2) (step 6). As described above with respect to the diagonal filtering of the vertical detail, diagonal filtering of detail information creates minimum perceptible energy loss. The samples of regions (2) and (3) signals are then combined to form a 2.5 megahertz bandwidth signal (step 7). Thus there is created a 2.5 megahertz bandwidth portion of an augmentation signal for improving both horizonal and vertical detail. This augmentation signal may then be time-compressed 2:1 and incorporated into a complete augmentation signal (FIG. 1) which has the appearance of an NTSC video signal comprising sidepanel luminance and chrominance information within remaining bandwidth.

Both the NTSC signal and the augmentation channel may be transmitted using vestigial sideband transmission in separate six megahertz RF channels. The NTSC portion 1 of the signal is compatible with existing receivers and CATV scrambling systems and used for regeneration of a normal 525 line, 2:1 interlaced NTSC picture.

Alternative transmission of the augmentation regions 2 and 3 is possible. For example, depending on whether broadcast, cable television, or direct satellite transmission is foreseen. What is important in comparision with the known Philips proposal is that by generating a line summation signal as well as a line difference signal, horizontal definition improvement is derived from the line summation signal. Furthermore, both the horizontal and vertical detail signals may be separately diagonally filtered and compactly transmitted in a 2.5 megahertz bandwidth in a flexible manner in any desired format for transmission of such information along with sidepanel luminance and chrominance information in remaining bandwidth. Also, as the application of the line summation signal (unlike the line difference signal) to derive a horizontal detail information signal leaves NTSC signal frequencies intact, the application of the line summation signal naturally permits the extraction of an NTSC like signal (steps 3 and 4).

An old NTSC receiver simply tunes to the NTSC signal. A new HDTV receiver tunes both the NTSC and augmentation signals and reconstructs a 525 line sequential scan picture with maximum vertical resolution of 480 lines vertical and 420 lines horizontal resolution respectively.

Figure 4:
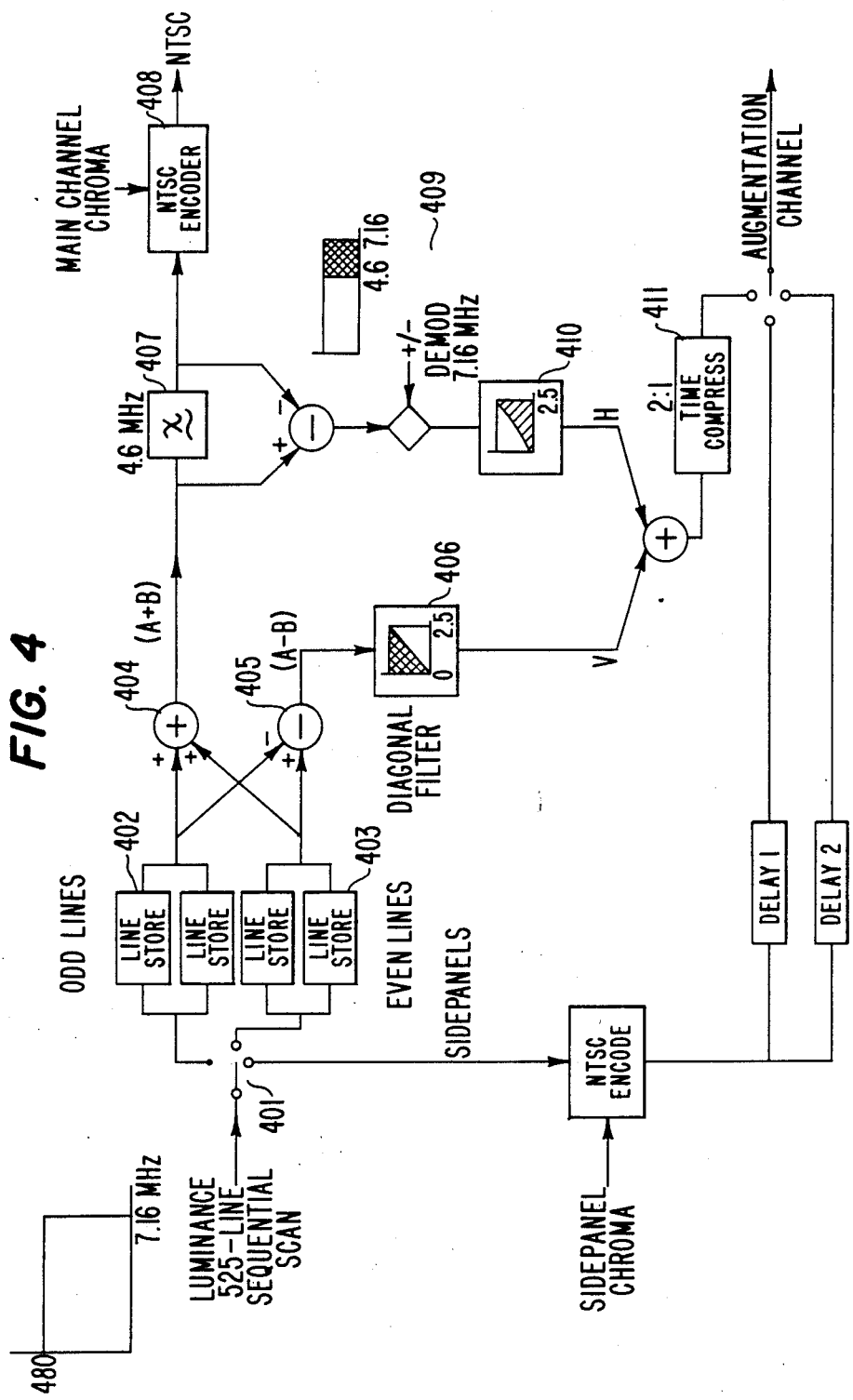
FIG. 4 is a schematic diagram of a transmitter practicing the method of encoding of FIG. 3.

Referring now to FIG. 4, there is shown a schematic diagram of a transmitter for encoding a high definition television signal for transmission according to the method of FIG. 3. The inputs assumed for the depicted encoder comprise a 525 line sequentially scanned luminance signal (FIG. 2) and chrominance signals. At demultiplexer 401, odd and even lines of the input luminance signal are separated as shown in FIG. 1 from sidepanel luminance signal. Odd lines are temporarily stored in odd line stores 402 and even lines in line stores 403. The sidepanels are encoded in conventional manner with sidepanel chrominance and depending on the multiplexing and transmission technique appropriate to the situation are placed in an appropriate format such as an NTSC appearing signal together with the vertical and horizontal detail signal forming an augmentation channel.

The present invention is concerned with the generation of the detail portion of the augmentation channel and a standard NTSC video signal.

In odd line stores 402 are stored a pair of odd numbered lines and in even line stores 403 are stored a pair of even numbered lines. Filters 404 and 405 represent vertical digital filters with coefficients 1,1 and 1,−1. Filter 404 provides a line summation signal A+B and filter 405 provides a line difference signal A−B. The line difference signal is diagonally filtered at filter 406 to recover vertical detail signal at baseband.

The line summation signal A+B is provided to complimentary highpass/lowpass digital filter 407. The lowpass region passed at baseband to approximately 4.6 megahertz is a luminance signal for encoding with NTSC baseband chrominance at NTSC encoder 408 for transmission.

The highpass signal at 4.6 to 7.16 megahertz is demodulated to baseband by negating alternate samples with the complimentary lowpass signal at demodulator 409. The result is then diagonally filtered at digital diagonal filter 410 creating a horizontal detail signal of 2.5 megahertz bandwidth.

Vertical detail signal V and horizontal detail signal H are combined and time-compressed 2:1 by reading out stored data at twice the rate the data is read in at time compression circuit 411. Thus, there may be transmitted a horizontal and vertical detail improvement portion of an NTSC-like augmentation channel which also may comprise sidepanel and chrominance information portions. Now, the process at a receiver will be discussed in some detail.

Figure 5:
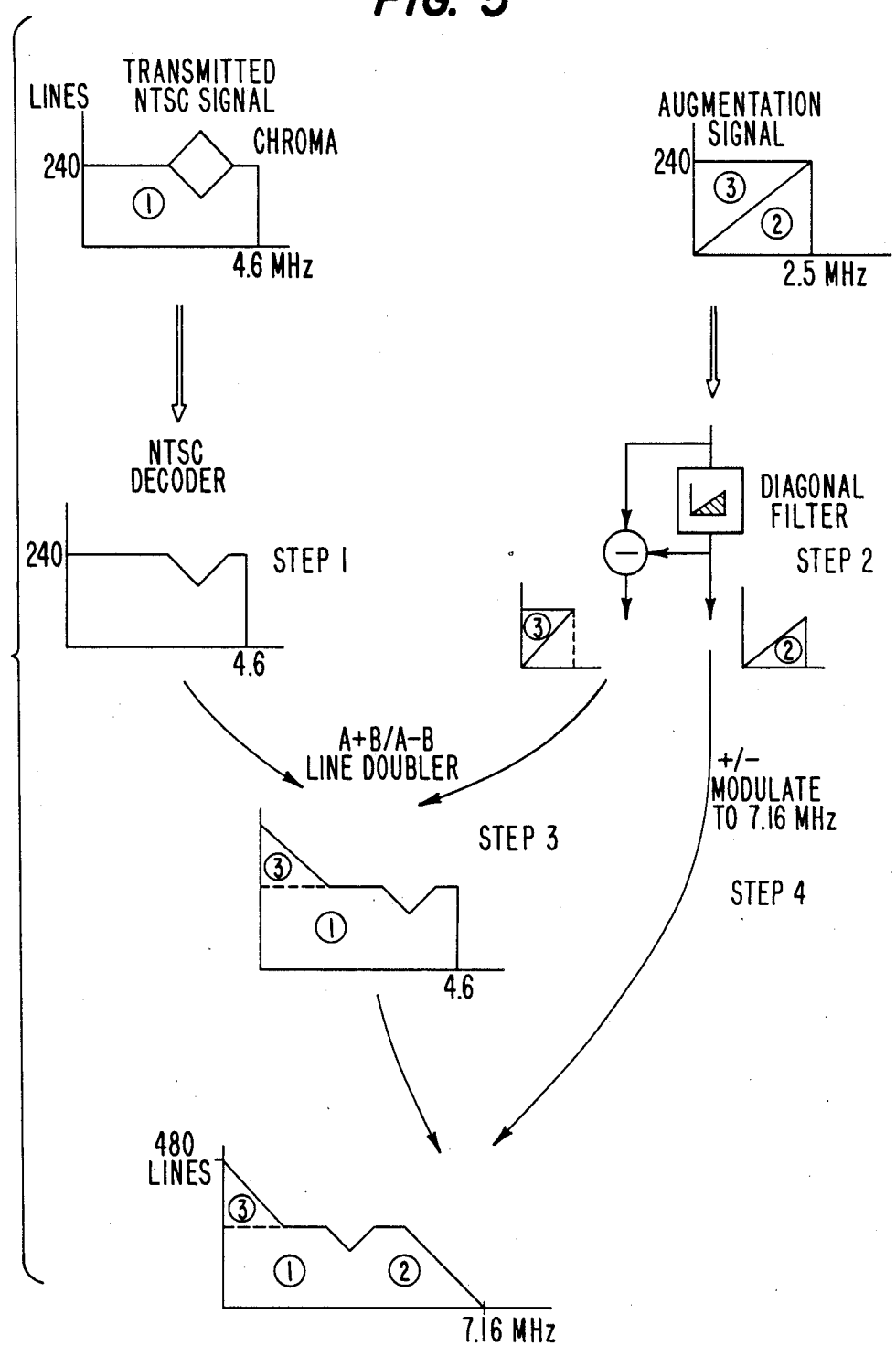
FIG. 5 is a pictorial representation of the complimentary method to the method of FIG. 3 which might occur at a receiver.

Referring to FIG. 5, there is received at an HDTV receiver both an NTSC channel and an augmentation channel. The NTSC channel is decoded using 2-dimensional digital filter techniques to extract the luminance information region 1 and the chrominance information at 3.58 megahertz (step 1).

The augmentation channel is time demultiplexed to separate the NTSC sidepanels (not shown). These are then processed via two dimensional digital filter techniques to isolate sidepanel data or via analog techniques. These sidepanels are then attached to the edges of the 4:3 aspect-ratio picture to increase the picture width to form a 16:9 aspect ratio, 525 line, 2:1 interlaced picture.

Referring to the top right of FIG. 5, the remainder of the augmentation channel (regions 2,3) is read into a line store clocked at 14.32 megahertz to be read out at half this rate or at 7.16 megahertz. This slower readout procedure accomplishes a 2:1 time decompression. Diagonal digital filters are then used to separate regions (2) and (3) where filtering in accordance with diagonal function f(w) provides region 3 and the complimentary function (1-f(w)) yields region 2 (step 2). The region (3) signal is the vertical line-difference signal which is combined with the decoded NTSC luminance signal to recreate the total 525 television lines necessary for the regeneration of twice line-frequency sequential scan (step 3).

The region (2) signal is extracted by band pass filtering and is remodulated to 7.16 megahertz by negating alternate samples at 14.32megahertz (step 4). The resultant samples are then bandpass filtered and added to all lines of the luminance signal, thereby contributing added horizontal detail bandwidth.

Figure 6:
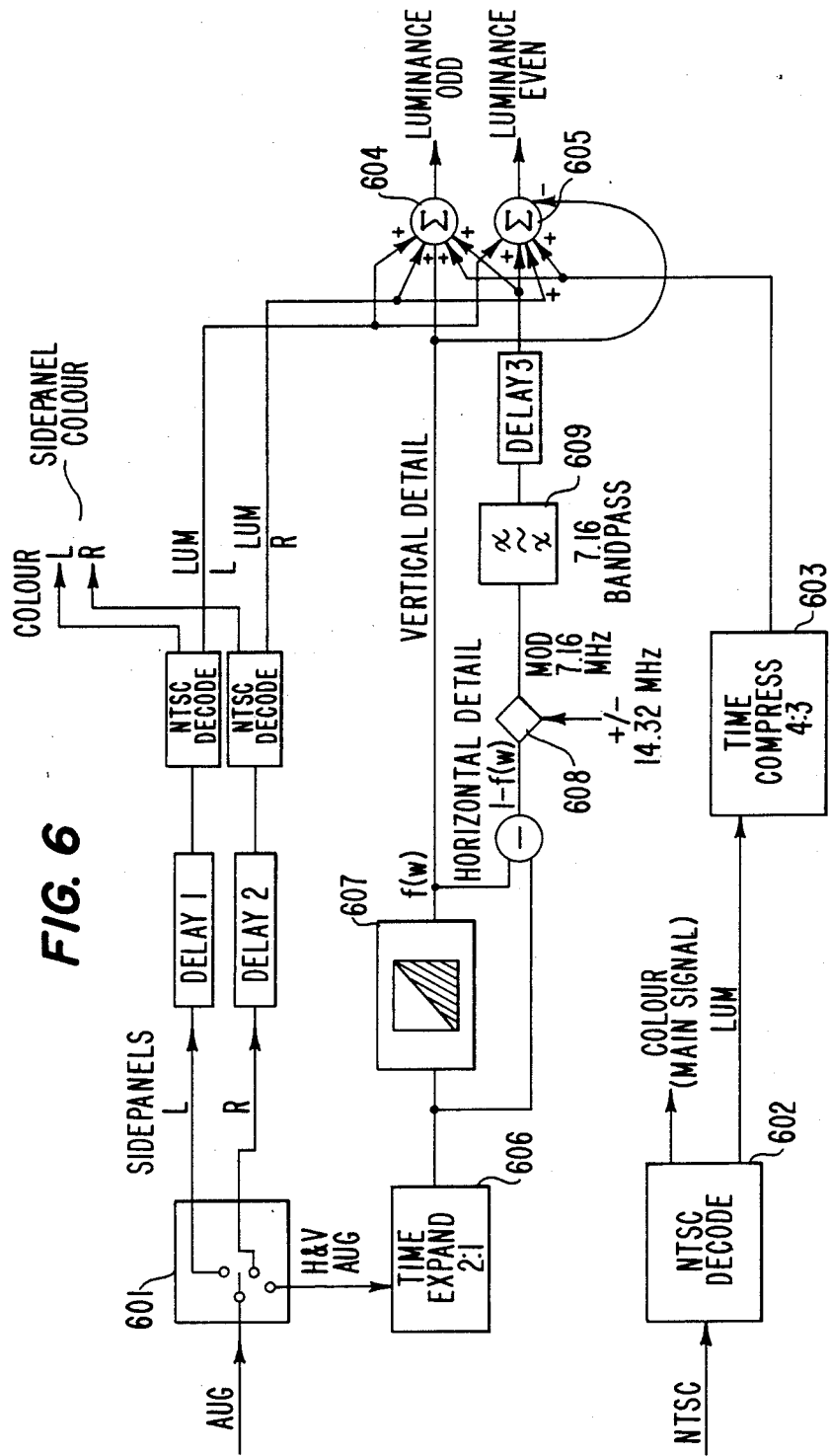
FIG. 6 is a schematic diagram of a receiver practicing the method of decoding of FIG. 5.

Referring now to FIG. 6, there is shown a decoder for reconstructing a high definition television signal from separate inputs comprising an NTSC signal and an augmentation signal. The augmentation signal AUG is provided to demultiplexer 601 which depending on the format of the augmentation channel separates the left sidepanel L, right sidepanel R and horizontal and vertical augmentation signal H&V AUG of 2.5 megahertz bandwidth.

The NTSC signal is decoded into chrominance and luminance at NTSC decoder 602. The primary chrominance information is supplemented by sidepanel color information and used to provide a full color image. The decoded luminance signal LUM is time compressed at time compression circuit 603 by a ratio of 4:3 and provided to odd and even line summation circuits 604, 605 respectively for additional vertical and horizontal detail and sidepanel addition.

The present invention primarily lies in the path followed by the horizontal and vertical augmentation signal H&V AUG which is first time expanded in a ratio of 2:1 at time expansion circuit 606. Diagonal filter 607, provides vertical detail signal by the diagonal function f(w) and horizontal detail signal by the complementary function 1−f(w) where f(w) is the diagonal functional filtering characteristic of filter 607. The vertical detail signal is added to odd lines and subtracted from even lines at odd line summation circuit 604 and even line summation circuit 605 respectively.

The horizontal detail signal is modulated up to 7.16 megahertz by negating alternate samples at 14.32 megahertz at modulator 608. The result is then passed through 7.16 megahertz bandpass filter 609. The output signal is delayed in synch with the decoded luminance signal and the delayed sidepanels L and R and added at odd and even summation circuits 604 and 605 to supplement the horizontal detail of the respective odd and even horizontal lines.

One advantage provided by the above-described decoder circuit over the Philips device is that the horizontal and vertical detail signals are derived via a single diagonal digital filter 607 and a complex analog filter arrangement is avoided. It is urged that the decoder circuitry is thus considerably simplified, is considerably more efficient and may be provided at reduced cost.

I claim:

1. A method at a transmitter for increasing the definition of a standard resolution video signal using a separate augmentation channel to increase the resolution of the standard resolution video signal, the augmentation channel comprising a line difference signal portion for improving vertical definition, the method characterized by the steps of generating a line summation signal, deriving a horizontal detail signal from the line summation signal, diagonally filtering the horizontal detail signal to provide a horizontal definition portion of the augmentation channel signal, and transmitting the horizontal and vertical definition portions of the augmentation channel for increasing the definition of the standard resolution video signal.

2. The method of claim 1 further characterized by the step of generating a standard resolution video signal for transmission with the augmentation channel from the generated line summation signal.

3. The method of claim 1 further characterized by the step of transmitting both the horizontal and vertical portions of the augmentation channel within a bandwidth of approximately 2.5 megahertz prior to compression.

4. The method of claim 1 further characterized by the step of adding the horizontal detail signal to the vertical definition signal prior to transmission.

5. The method of claim 1 further characterized by the step of negating of alternate samples to translate high frequency energy to baseband prior to diagonal filtering.

6. A method at a receiver for increasing the definition of a standard resolution video signal using a separate augmentation channel, the augmentation channel comprising a line difference signal portion for improving vertical definition, the method characterized by the steps of diagonally filtering the augmentation channel to recover a horizontal and a vertical detail portion, modulating the horizontal detail portion to high frequency, and adding the horizontal and vertical detail portions to the standard signal to generate odd and even lines respectively.

7. A method in accordance with claim 6 further characterized in that the filtering step comprises a digital diagonal filtering with a characteristic function f(w), the function f(w) providing the vertical detail signal and the complimentary function 1−f(w) providing the horizontal detail.

8. A method in accordance with claim 6 further characterized in that in the modulating step, the high frequency is a multiple of the color subcarrier.

9. A method in accordance with claim 6 further characterized by the step of time expanding the augmentation channel containing horizontal and vertical detail portions by 2:1 prior to diagonal filtering.

10. An encoder for encoding detail information for transmission in a separate augmentation channel for providing improved horizontal and vertical definition to a separately transmitted standard resolution video signal by means of the separate augmentation channel, the encoder characterized by means for generating a line summation signal, means for deriving a horizontal detail signal from the generated line summation signal, and means for diagonally filtering the horizontal detail signal to provide a horizontal detail portion of the augmentation channel.

11. An encoder in accordance with claim 10 further characterized by means for combining the horizontal detail portion with a vertical detail portion for transmission.

12. An encoded in accordance with claim 10 further characterized by means for deriving a standard resolution signal from the generated line summation signal.

13. A decoder for decoding an augmentation channel for providing improved horizontal and vertical definition to a separately transmitted standard resolution video signal, the decoder comprising a time expansion circuit, responsive to the augmentation channel signal portion, for reading in and more slowly reading out line samples from a line memory, a diagonal filter circuit coupled to the output of the time expansion circuit for deriving vertical detail and horizontal detail signals and a summation circuit for adding the horizontal and vertical detail to the standard resolution video signal.

14. The decoder of claim 13 wherein the filter circuit more particularly comprises a digital diagonal filter having a diagonal function f(w), the diagonal function f(w) providing the vertical detail and the complimentary function 1−f(w) providing the horizontal detail.

15. A method at a transmitter for increasing the definition of a standard resolution video signal using a separate augmentation channel, the augmentation channel comprising a line difference signal portion for improving vertical definition, the method characterized by the steps of generating a line summation signal, deriving a horizontal detail signal from the line summation signal by high pass filtering, diagonally filtering the horizontal detail signal to provide a horizontal definition portion of the augmentation channel signal, and transmitting the horizontal and vertical portions on the augmentation channel for increasing the definition of the standard resolution video signal.

16. The method of claim 15 further characterized by the step of generating a standard resolution video signal for transmission with the augmentation channel from the generated line summation signal.

17. The method of claim 15 further characterized by the step of deriving side panel information portions for transmission with the horizontal and vertical portions on the augmentation channel.

18. The method of claim 15 further characterized in that the horizontal and vertical portions are transmitted within a bandwidth of 2.5 megahertz prior to compression of the augmentation channel.

19. The method of claim 15 further characterized in that prior to the horizontal detail signal filtering step alternate samples are negater to translate high frequency energy to baseband.

20. A method at a receiver for increasing the definition of a standard resolution video signal using a separate augmentation channel, the augmentation channel comprising a line difference signal portion for improving vertical definition, the method characterized by the steps of diagonally filtering the augmentation channel to recover a horizontal and a vertical detail portion, modulating the horizontal detail portion to high frequency, and adding the horizontal and vertical detail to the standard signal to generate odd and even lines respectively.

21. The method according to claim 20 further characterized by the step of time expanding the received augmentation channel prior to diagonal filtering.

22. A decoder for decoding an augmentation channel for providing improved horizontal and vertical definition to a separately transmitted standard resolution video signal, the decoder comprising a time expansion circuit, responsive to an augmentation channel signal portion, for reading in and more slowly reading out line samples from a line memory, a diagonal filter circuit coupled to the output of the time expansion circuit for deriving vertical and horizontal detail signals and a summation circuit for adding the horizontal and vertical detail to the standard resolution video signal to generate odd and even lines.

* * * * *